US012626292B2

(12) United States Patent
Stanton et al.

(10) Patent No.: US 12,626,292 B2
(45) Date of Patent: May 12, 2026

(54) PROCESSING QUERIES USING REINFORCEMENT LEARNING

(71) Applicant: Etsy, Inc., Brooklyn, NY (US)

(72) Inventors: Andrew Stanton, Brooklyn, NY (US); Arthur Maciejewicz, Brooklyn, NY (US); Stephen Balogh, Brooklyn, NY (US)

(73) Assignee: Etsy, Inc.

( * ) Notice: Subject to any disclaimer, the term of this patent is extended or adjusted under 35 U.S.C. 154(b) by 167 days.

(21) Appl. No.: 18/394,543

(22) Filed: Dec. 22, 2023

(65) Prior Publication Data

US 2025/0209513 A1      Jun. 26, 2025

(51) Int. Cl.
G06Q 30/0601        (2023.01)
G06Q 30/0201        (2023.01)

(52) U.S. Cl.
CPC ..... G06Q 30/0631 (2013.01); G06Q 30/0201 (2013.01)

(58) Field of Classification Search
None
See application file for complete search history.

(56) References Cited

U.S. PATENT DOCUMENTS

| | | | |
|---|---|---|---|
| 9,147,273 B1 * | 9/2015 | Allen | G16B 5/20 |
| 10,671,672 B1 * | 6/2020 | Eksombatchai | G06F 16/435 |
| 10,771,572 B1 * | 9/2020 | Gupta | H04L 67/535 |
| 2015/0032767 A1 * | 1/2015 | Gao | G06F 16/9535 |
| | | | 707/765 |
| 2016/0034530 A1 | 2/2016 | Nguyen et al. | |
| 2017/0091319 A1 | 3/2017 | Legrand et al. | |
| 2025/0265494 A1 | 8/2025 | Stanton et al. | |

FOREIGN PATENT DOCUMENTS

WO      WO 2023212360 A1      11/2023

OTHER PUBLICATIONS

Das et al., "Go For a Walk and Arrive at the Answer: Reasoning Over Paths in Knowledge Bases Using Reinforcement Learning," CoRR, submitted on Nov. 2017, arXiv:1711.05851, 18 pages.
Extended European Search Report in European Appln No. 24217706. 1, dated Jun. 11, 2025, 11 pages.

(Continued)

*Primary Examiner* — Richard L Bowen
(74) *Attorney, Agent, or Firm* — Fish & Richardson P.C.

(57) ABSTRACT

Methods, systems, and apparatus, including computer programs encoded on a computer storage medium, for processing a user query, comprising receiving a user query corresponding to a primary node in the computational graph; processing the user query to determine one or more listing nodes in the computational graph, providing, to the user device, data associated with one or more listing nodes. The processing comprises: determining a first set of random walks starting at the primary node according to a policy, determining a second set of random walks starting at one or more secondary nodes according to the policy, determining a final score for each of a first set of listing nodes reached by the first set of random walks, and determining the one or more listing nodes from the first set of listing nodes based on the final scores.

21 Claims, 6 Drawing Sheets

(56) References Cited

OTHER PUBLICATIONS

Tong et al., "Combinatorial optimization meets reinforcement learning: effective taxi order dispatching at large-scale," IEEE Transaction on Knowledge and Data Engineering, Nov. 2021, 35(10):9812-9823.

Zhang et al., "Learning-to-Dispatch: Reinforcement Learning Based Flight Planning under Emergency," CoRR, submitted on Jul. 2021, arXiv:2107.04897, 7 pages.

* cited by examiner

500

Receive a user query ⌐502

Determine a first set of random walks ⌐504

Determine a second set of random walks ⌐506

Determine a final score for each of a set of listing nodes reached by the first set of random walks ⌐508

Determine one or more listing nodes for the user query based on the final scores ⌐510

PROCESSING QUERIES USING REINFORCEMENT LEARNING

BACKGROUND

This specification relates to processing a user query for information, e.g., on an exchange platform, and in particular, relates to processing the user query along a computational graph using reinforcement learning.

An example exchange platform enables the exchange of goods, content, and services between end users and providers. Providers can list or provide their goods, content, and services on the exchange platform, and end users obtain the goods, content, and services from the providers via the exchange platform.

Reinforcement learning systems can be deployed in such platforms to facilitate various operations of the platform, including, e.g., search and retrieval of information, e.g., information related to items provided on the platform. In a reinforcement learning system, an agent generally interacts with an environment by performing actions that are selected by the reinforcement learning system in response to receiving observations that characterize the current state of the environment. Some reinforcement learning systems select the action to be performed by the agent in response to receiving a given observation in accordance with the output of a neural network. One example reinforcement learning technique includes random walks.

SUMMARY

This specification relates to processing a user query on a computing platform along a computational graph with multiple nodes and edges to generate output data for the user query. In particular, the processing described here is in parallel, and the user query is processed using reinforcement learning techniques. One example of reinforcement learning techniques described herein relates to performing multiple random walks starting at respective nodes in the computational graph in parallel. Based on the user query, a system performing the described techniques determines a primary node in the computational graph that corresponds to the user query and determines one or more secondary nodes in the computational graph that corresponds to contextual information related to the user providing the user query. The one or more secondary nodes are different from the primary node. The system performs a first set of random walks starting at the primary node to reach a first set of listing nodes and a second set of random walks, each starting at one of the one or more secondary nodes to teach a second set of listing nodes. Both the first and second sets of random walks are performed according to a policy trained using reinforcement learning techniques over the computational graph. The system determines a final score for each of the first set of listing nodes reached via the first set of random walks starting at the primary node based at least on the characteristics of the second set of listing nodes reached via the second set of random walks starting at the one or more secondary nodes. The system determines one or more listing nodes from the first set of listing nodes based on the final scores and provides data associated with the one or more listing nodes as an output for the user query to the user device.

Particular embodiments of the subject matter described in this specification can be implemented to realize one or more of the following advantages. For example, the described techniques in this specification improve the accuracy of determining listing nodes for a user query. By including additional random walks from secondary nodes, the system can reach listing nodes via random walks starting at the secondary nodes, thus enabling the system explore possible listing nodes that might be reached via random walks starting at the primary node. In addition, since the secondary nodes are determined based on the contextual information (e.g., data related to user activities), listing nodes reached by random walks from secondary nodes could be used to determine output data that are more customized for users than those reached by primary nodes otherwise determined merely based on user queries.

In addition, the techniques described herein can improve the computational efficiency of processing a user query since different sets of random walks starting at different nodes (e.g., primary nodes and secondary nodes) are performed using different threads/cores in parallel. Each thread or core can be initialized using different random seeds to ensure that each random walk result is independent or different from the rest of the random walks. The described multi-thread or multi-core implementation of random walks allows a system to perform ten (10) times more total random walk samplings within a given latency than serial operations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
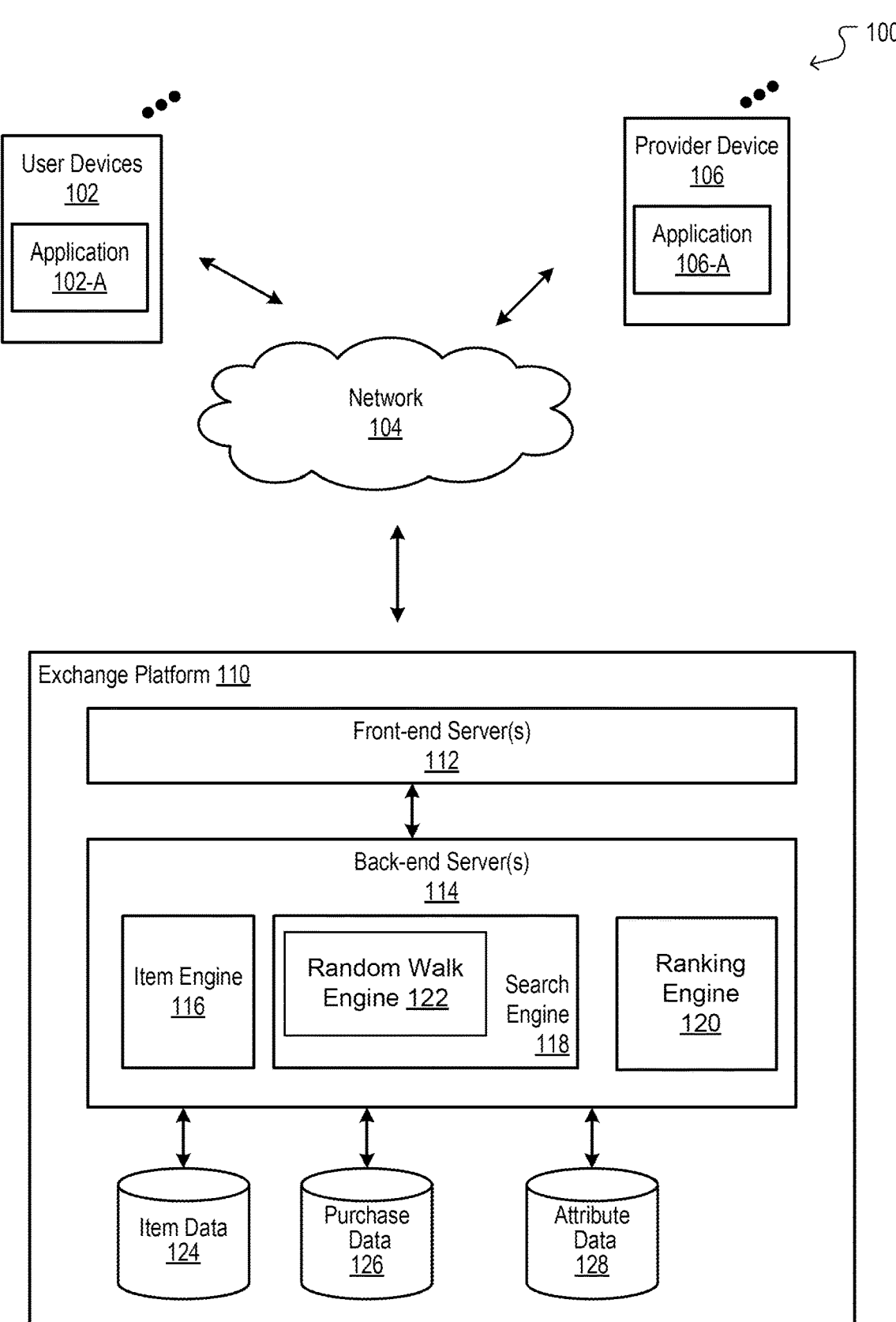
FIG. 1 is a block diagram of an example environment in which an exchange platform facilitates an exchange of goods, services, or content between providers and users.

The described techniques are generally related to processing user queries to provide output predictions (e.g., of product listings) responsive to the user queries on a computing platform, e.g., an exchange platform. In particular, the described techniques relate to processing user queries using different sets of random walks starting at different nodes in the computational graph such that one or more listing nodes might be associated with boosted scores, and the output predictions for user queries can be determined based on the boosted scores.

In general, an exchange platform is a platform configured to support item exchange and provide information or listings of items in response to user queries. The techniques described herein are also applicable in other applications, including but not limited to, search engine applications, recommendation systems, etc. For brevity and ease of description, the following description is described in the context of exchange platforms.

In an example implementation in the context of an exchange platform, providers may provide items (e.g., goods, services, and content) on an exchange platform that users of the exchange platform (e.g., registered members of the platform or guests of the platform) can obtain. Within a web page provided by the exchange platform, a user can input search queries into a search bar, and in response, the exchange platform can identify listings responsive to the query and provide the listings within a first web page listing items matching the search queries. The user may interact with these items, for example, browse these items without further actions, click one or more listings to get more information related to the corresponding items, add one or more items to a shopping cart, or purchase one or more items.

Relations of user queries with listings of items on an exchange platform can be generally represented using a computational graph, and the described techniques can use a computational graph to determine an output (e.g., an item) to be provided in response to the user query. The computational graph can be represented as a directional graph or a non-directional graph. A directional graph can include multiple nodes and directional edges connecting corresponding nodes. For example, nodes can include query nodes, shop nodes, listing nodes, etc. By performing random walk sampling to search a trajectory including a plurality of connecting directional edges linking nodes starting from an initial node (i.e., a query node or a shop node) to a terminal node (e.g., a listing node representing a listed item), the terminal node can be provided as an output in response to processing the user query.

In this document, random walk samplings can be performed at different nodes, e.g., a primary node or one or more secondary nodes. A primary node described herein generally refers to a query node that is directly associated with a user query. A primary node can be determined based on the text of a user query, e.g., using natural language processing or a pre-determined look-up table. A secondary node, on the other hand, can be determined based on contextual information stored on a server or a host. The contextual information can include data related to a user providing the user query, e.g., the activity history of the user such as user clicks on a particular shop or item, user purchases of an item at a particular shop, etc. Since random walks starting at different nodes might reach one or more common listing nodes and can be performed in parallel by multiple threads or cores, these one or more common listing nodes are boosted in scores and thus are more likely selected as output data for the user query. This way, the user query could be more efficiently and accurately processed, as described above in the summary. More details of a computational graph are described below in connection with FIGS. 3 and 4.

The described random walk samplings are performed using reinforcement learning in the computational graph. More specifically, trajectories including nodes and edges obtained in random walks are more advantageous than conventional heuristic methods, which suffer from multiple drawbacks. The conventional heuristic methods generally do not consider contextual or accumulated information associated with a particular user account that requests the user query or other statistical data obtained or stored in the exchange platform. Nor do conventional heuristic methods consider user or system feedback when selecting one of the directional edges, let alone distinguishing users' positive interactions from negative interactions. In addition, conventional heuristic methods do not optimize or control biasing directional edges across different clusters in the directional graph. On the other hand, random walk sampling within a reinforcement learning context could consider contextual information, user feedback, and the positiveness of user interactions. Together with the above-described boosting scheme (e.g., performing random walks at both a primary node and one or more secondary nodes) and the parallel implementation (e.g., a multi-thread implementation), the random walk sampling techniques described herein can efficiently and accurately process a user query in a computational graph.

FIG. 1 is a block diagram of an example environment 100 in which an exchange platform 110 facilitates an exchange of items (such as goods, services, or content) between providers and users. The example environment 100 includes a network 104, such as a local area network (LAN), a wide area network (WAN), the Internet, or a combination thereof. The network 104 connects one or more user devices 102, one or more provider devices 106, an exchange platform 110, and one or more external sources 108.

User device 102 and provider device 106 are electronic devices that are capable of requesting and receiving data over the network 104. Examples of such devices include personal computers, mobile communication devices, digital assistant devices, and other devices that can send and receive data over the network 108.

The exchange platform 110 is a computing platform that can be operated and maintained by an exchange service provider. The exchange platform 110 enables providers to list their items on the exchange platform 110 and enables users to obtain the items listed on the exchange platform 110. As depicted in the block diagram of FIG. 1, the exchange platform 110 is depicted as a single block with various sub-blocks. However, while the exchange platform 110 could be a single device or single set of devices, this specification contemplates that the exchange platform 110 could also be a group of devices, or even multiple different systems that communicate with each other to enable the exchange of goods, services, and/or content. The exchange platform 110 could also be a provider of items, i.e., the provider device 106 and the exchange platform 110 can be integrated with each other. Alternatively, the exchange platform 110 can be an entity different from the provider, i.e., the provider device 106 and the exchange platform 110 can be separate, as shown in FIG. 1.

A provider uses an application 106-A executing on a provider device 106 to communicate with the exchange platform 110 to, for example, create or manage listings of items of provider on the exchange platform 110 and/or perform other appropriate tasks related to the exchange platform 110 (e.g., transfer an amount to the provider based on items obtained by users). The application 106-A can transmit data to, and receive data from, the exchange platform 110 over the network 104. The application 106-A can be implemented as a native application developed for a particular platform or a particular device, a web browser that provides a web interface, or another appropriate type of application. The application 106-A can present and detect user interactions (e.g., user's touch, mouse clicks, etc.) with various interfaces that enable, for example, the provider to create and manage listings of the provider's items on the exchange platform 110.

Users of a user device 102 can use an application 102-A to communicate with the exchange platform 110 to, for example, view listings of items, search for items, obtain items, and/or perform other appropriate tasks related to the exchange platform 110. The application 102-A can transmit data to, and receive data from, the exchange platform 110 over the network 104. The application 102-A can be implemented as a native application developed for a particular platform or a particular device, a web browser that provides a web interface, or another appropriate type of application. The application 102-A can present and detect user interactions (e.g., user's touch, mouse clicks, etc.) with various interfaces that enable, for example, the user to view listings of items, search for items, obtain items, and/or perform other appropriate tasks related to the exchange platform 110.

The exchange platform 110 includes one or more front-end servers 112 and one or more back-end servers 114. The front-end servers 112 can transmit data to, and receive data from, user devices 102 and provider devices 106, over the network 104. For example, the front-end servers 112 can provide interfaces and/or data for presentation with the interfaces to applications 102-A and 106-A executing on user devices 102 and provider devices 106, respectively. The front-end servers 112 can also receive data specifying user interactions with the interfaces provided by the front-end servers 112 to user devices 102 and provider devices 106. The front-end servers 112 can update the interfaces, provide new interfaces, and/or update the data presented by the interfaces presented in applications 102-A and 106-A, respectively, based on user/provider interactions with user devices 102 and provider devices 106.

The front-end servers 112 can also communicate with the back-end servers 114. For example, the front-end servers 112 can identify data to be processed by the back-end servers 114, e.g., data specifying information necessary to create listings requested by a provider 106, data specifying the quantity of a given item that a user of user device 102 is requesting to obtain. The front-end servers 112 can also receive, from the back-end servers 114, data for a particular user of a user device 102 or data for a particular provider of a provider device 106, and transmit the data to the appropriate user device 102 or provider device 106 over the network 104.

The back-end servers 114 include an item engine 116, a search engine 118, and a ranking engine 120. As used in this specification, the term "engine" refers to hardware, e.g., one or more data processing apparatuses (e.g., one or more processors), which execute a set of programming instructions, that result in the performance of a set of tasks. Although FIG. 1 depicts these three engines, the operations of these engines as described in this specification may be performed, wholly or in part, by one or more other engines. In other words, some implementations may include more than the three engines depicted in FIG. 1 to perform operations described in this specification. Alternatively, some implementations may include fewer engines to perform the operations described in this specification. Furthermore, even if an implementation includes the same three engines depicted in FIG. 1, the operations performed by one of these engines, as described in this specification, may be performed by one or more of the other engines.

The item engine 116 manages the creation and modification of listings of items, as requested by a provider via application 106-A on a provider device 106. The item engine 116 can receive from the front end-servers 112, data specifying a description of an item for a listing initiated by a provider. Based on this description, item engine 116 can create the listing within the exchange platform 110. The description of the item can include, for example, a name for the item, a brief description of the item, a quantity of the item, an amount required to obtain the particular item, an amount required to deliver the item to a destination, a fulfillment time for the item to arrive at the destination, and one or more images of the item. The item engine 116 can use some or all of this information to create a listing for the items on the exchange platform 110. The item engine 116 can store the data for the listing, including the received information, in an item data storage device 124. The item data storage device 124 can include one or more databases (or other appropriate data storage structures) stored in one or more non-transitory data storage media (e.g., hard drive(s), flash memory, etc.).

The item engine 116 can also receive from the front end-servers 112, data specifying features of an item listing that a provider 106 may want to modify. For example, provider 106, through application 106-A, may seek to modify one or more features of the provider's item listed on the exchange platform 110. The modified features are communicated from application 106-A to front-end server 112 over network 104. The item engine 116 in turn receives from the front end-servers 112, data specifying features of the item listing that the provider 106 wants to modify. The features to be modified may include, for example, the quantity of available items and the amount required to obtain the item. The item engine 116 can use the data about the modified features to modify the listing for the items on the exchange platform 110. The item engine 116 can then use the modified features to update the item's features stored in the item data storage device 124.

The search engine 118 manages retrieval of listings of items, corresponding to a user query requested by a user via application 102-A on a user device 102. The search engine 118 can receive from the front-end servers 112, data specifying a user's request to search for items and retrieve items in line with the user's request. If a user searches for an item or a type of item on the exchange platform, the user inputs a search query into a search bar of the application 102-A. The user's search query is received by front-end servers 112, which in turn sends the search query to the search engine 118. The search engine 118 uses the data specified in the search query to identify listing(s) of items stored in the item data storage device 124. The search engine 118 communicates the identified listing(s) of items to the front-end servers 112, which in turn provides a particular listing or a summary of listings for presentation on the application 102-A. If a summary of listings is presented to the user in application 102-A, the user can select a link for one listing from among the summary of listings. The user's selection of the link is received by the front-end server 112, which interprets the user's selection as a request for data about the particular listing. The front-end servers 112 request search engine 118 to provide data about the particular listing, which the search engine 118 obtains from the item data storage device 124. The search engine 118 responds to the front-end servers 112 with the obtained data, which is then provided by the front-end servers 112 to the application 102-A in the form of a page/tab showing a listing for the item. The page can be a content page in a native application, a web page in a web browser, etc.

The search engine 118 can further include a random walk engine 122 configured to process user queries in a computational graph by performing random walk sampling starting at different nodes in the computational graph. More details of the process and the random walk engine 122 are described in connection with FIG. 2.

If a summary of listings, i.e., a plurality of items, is presented to the user in application 102-A, the ranking engine 120 is used to rank the plurality of items in a pre-determined order. For example, the pre-determined order can include a descending order of relevance to the user's query. In some cases, the pre-determined order can include a descending order of interest to the user. In these cases, the ranking engine extracts a descriptive set of attributes (such as its color, texture, material, and shape) from each item and learns which attributes the user's interactions (e.g., likes or dislikes, clicks or passing), forming an interpretable user preference profile that is used to rank the plurality of items in real-time. An affinity score (e.g., a Beta distribution) can be calculated for each attribute. The parameters of the affinity score corresponding to each attribute are stored in the attribute data storage device 128. The attribute data storage device 128 can include one or more databases (or other appropriate data storage structures) stored in one or more non-transitory data storage media (e.g., hard drive(s), flash memory, etc.).

When a user views a listing for an item on the exchange platform displayed on the application 102-A, the user may decide to obtain the item. The user may select a button (or other appropriate user interface element) on the interface presented on application 102-A, which may result in the front-end servers 112 providing a different user interface to the user where the user can enter pertinent details (e.g., quantity of the item, the destination address, payment information) to begin the fulfillment process for obtaining the item. Upon submitting this information (e.g., by clicking a submit button on the user interface), the details entered by the user along with features of the item that the user wants are received by the front-end servers 112 and passed to the item engine 116. The item engine 116 evaluates whether the received data is valid (e.g., whether the quantity of the item requested by the user is the same or less than the available quantity of the item, whether the shipping address is correct, whether the payment information is correct).

If the data received from the user is invalid, the item engine 116 sends a message to the front-end servers 112 indicating that the request is denied, and optionally, may also include a reason explaining why the request was denied (e.g., a payment instrument was not approved or the input shipping address is invalid). The front-end servers 112 can provide a new user interface for presentation in application 102-A, in which the user is notified that the user's request was unsuccessful.

If, however, the data received from the user is valid, the item engine 116 processes the payment using the received payment information and sends a message, including the received user data, to the appropriate provider to begin the fulfillment process. The item engine 116 may store purchase information about the item (e.g., an identifier of the user purchasing the item, the quantity of the item purchased, the amount provided for the item, the date of purchase) in a purchase data storage device 126. The purchase data storage device 126 can include one or more databases (or other appropriate data storage structures) stored in one or more non-transitory data storage media (e.g., hard drive(s), flash memory, etc.). In this specification, purchase data 126 and the attribute date 128 are used to generate or as contextual information associated with a user that requests performing a particular user query.

Subsequently, the item engine 116 can send a message to the front-end servers 112, indicating that fulfillment processing has begun. Upon receiving this message from the item engine 116, the front-end servers 112 can provide a new user interface for presentation in application 102-A, in which the user is notified that the user's request was successful and that the order processing has begun.

Figure 2:
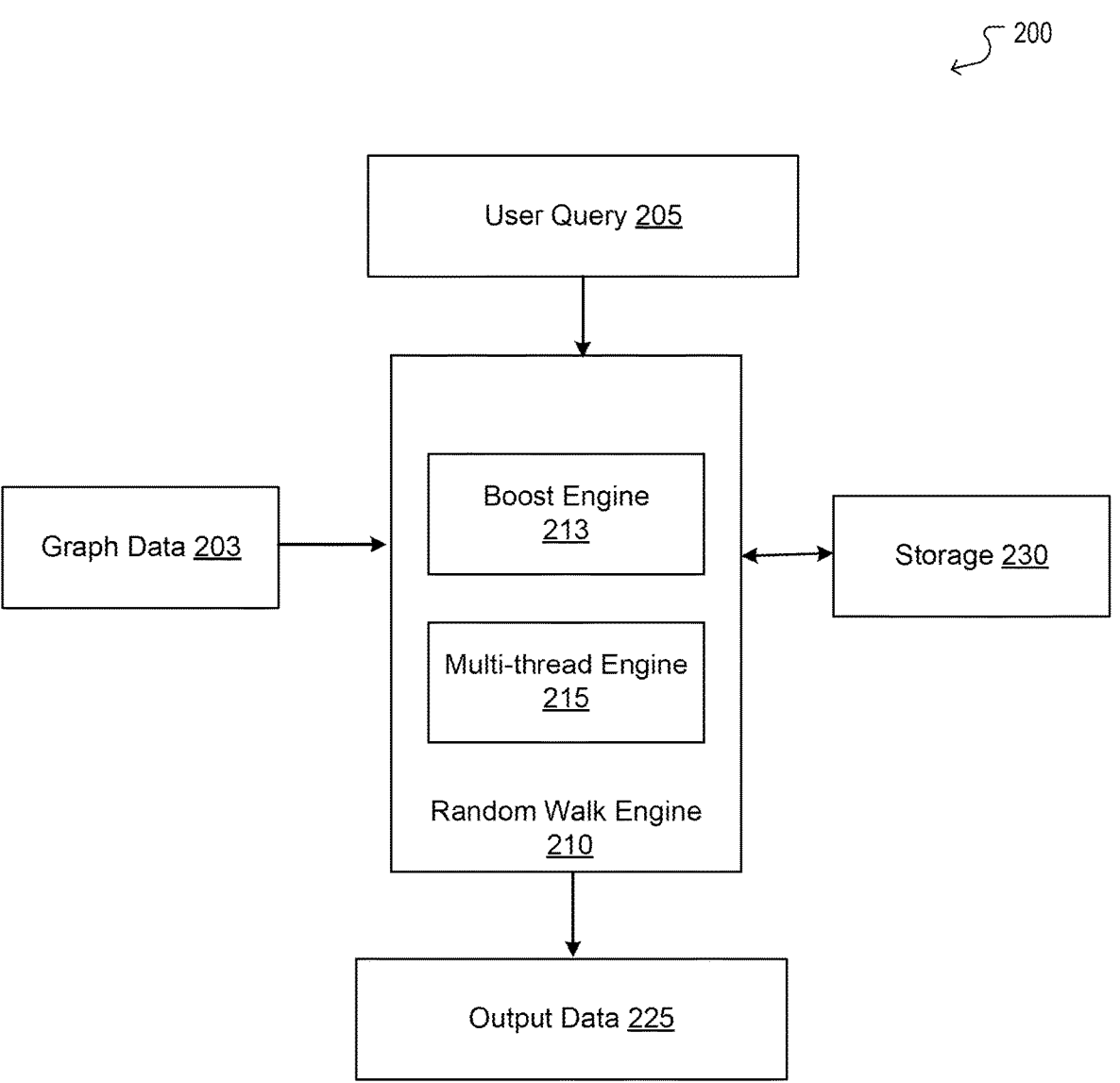
FIG. 2 is a block diagram that illustrates an example system for processing a user query.

FIG. 2 is a block diagram that illustrates an example system (e.g., random walk engine 210) for processing a user query. The random walk engine 210 can be equivalent to the random walk engine 122, which is part of the search engine 118 as depicted in FIG. 1.

As shown in FIG. 2, the random walk engine 210 can process input including one or more user queries 205 and graph data 213 to generate output data 225 in response to the one or more user queries 205. More specifically, the random walk engine 210 can perform a boosting scheme to boost scores for selecting output listings as output data 225. The boosting scheme relates to performing in parallel multiple random walk samplings starting at primary nodes and secondary nodes.

A user query 205 can be received by the exchange platform (e.g., the exchange platform 110 of FIG. 1) from a user device (e.g., device 102 of FIG. 1) corresponding to a user of a user account of the exchange platform 110. The user device can include a smartphone, a smart tablet, a smart wearable device (e.g., a smartwatch), a computer, or other suitable user devices. The user account can be a registered account of the exchange platform or a guest account or identifier attached to a non-registered user of the platform (e.g., without registration). The user query can include a request for data that represents a list of items (e.g., goods, services, and content) on the exchange platform 110 that users of the exchange platform can obtain. The exchange platform can transmit the data corresponding to the user query for representing (e.g., displaying) on a user device.

A user query generally includes information that can be suitably represented by a query node in a computational graph. A user query can include a textual portion, a graphical portion, or a combination of the two. For example, the user query can include the text "ring" and a corresponding query node can be a note, corresponding to the text "ring," of a computational graph (e.g., a directional graph). The query node for a user query can be determined based on the textual portion, a graphical portion, or both, of the user query via natural language processing, a lookup table, etc. Multiple random walks can be performed by the random walk engine 210 to reach one or more listing nodes in the computational graph. A listing node is a node in the computational graph representing a respective item (or a listing of items). In the example of a user query for a "ring," the listing nodes can represent a listing of items such as "wedding rings," "engagement rings," "diamond rings," or other related goods. In this specification, the random walk engine 210 can perform 50,000, 100,000, 500,000, or more random walks starting from a primary node for a user query.

In some implementations, the user query can further include contextual information such as a user identifier, the user's previous social activities performed on the exchange platform, historical information related to the user's previous purchases, sales, or both, and tags associated with the user account referring to a genre of at least one of preferences, items, services, content, or activities. The contextual information can be obtained from storage of the system (e.g., a purchase data 126 and/or attribute data 128 of FIG. 1, or storage 230 of FIG. 2). In these implementations, the random walk engine 210 can perform additional random walk samplings to boost the original random walk samplings starting at primary nodes (e.g., query nodes).

In general, the boost engine 213 included in the random walk engine 210 can perform a boosting scheme to customize listings of items to be recommended to users in response to a particular user query. The boost engine 213 is configured to determine one or more secondary nodes based on the contextual information associated with a user that provides a particular user query. A secondary node can include a shop node representing a shop or a provider that a user has most recently visited or purchased an item from, a shop saved to a user profile, or an item of the shop that has been added to a shopping. In some cases, the secondary nodes can include multiple shops, e.g., the 2, 3, 5, 10 or more most-recently visited shops. In some cases, the secondary node can be determined based on a threshold time period since the last visit of a shop by a user.

The boost engine 213 can determine additional random walks starting at one or more secondary nodes and perform the additional random walks. These additional random walks would reach listing nodes in the computational graph. The listing nodes reached via these additional random walks can be determined and used to boost scores of some of the listing nodes reached by random walks starting at the primary node for the user query. More details of the scores and how the scores for listing nodes are boosted are described in connection with FIG. 4.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Referring back to the computational graph in graph data 203, a computational graph can be generated from historical data representing relations between user queries and corresponding listings of items. Historical data, for instance, can include historical user queries and corresponding listings of items provided to the historical user queries. Historical data can further include user interactions with the provided listings of items, e.g., clicking, adding to carts, purchasing, or indicating a lack of interest. Graph data 203 can be represented as a computational graph. A computational graph generally includes multiple nodes that are interconnected by unidirectional edges. Within the context of the exchange platform and assuming the computational graph being directional, user queries can be grouped into query nodes, and listing items can be grouped into listing nodes. The graph data 203 representing a computational graph can be stored in the exchange platform 110, e.g., a memory device of the exchange platform 110.

As described above, a random walk sampling can generate a trajectory starting from an initial node and ends at a terminal node. According to the techniques described herein, a random walk can start from a secondary node other than a primary node. Thus, an initial node for a trajectory searched by a random walk sampling can be a primary node (e.g., a query node) or a secondary node (e.g., a shop node), and a terminal node for the trajectory searched by the random walk sampling can be a listing node that represents an item or a listing of items.

The trajectory further includes intermediate nodes connecting the initial node and terminal node. The intermediate nodes can include, for example, a shop node(S) representing a shop on the exchange platform, a tag node (T) representing a seller-specific tag or category for a corresponding product, and a user node (U) representing a user associated with the user query. In some cases, a shop node and a user node can be represented by an array of numbers (e.g., "User: 5928" and "Shop: 1529"), and a tag node and a user query node can be represented by a string or a sequence of characters or letters (e.g., "Tag: clothing" and "Query: wedding dress").

The random walk samplings described herein are performed according to a policy trained using reinforming learning. In general, the policy predicts an action (e.g., a edge to move from a node to a next node) for a current node based on rewards associated with actions (e.g., edge weights or scores for different edges). In general, a trajectory with higher rewards has a higher probability of being sampled by a random walk sampling process. Random walk engine 210 further determines or receive date determining characteristics of a random walk, e.g., a maximum length or steps of a random walk, a termination condition for a random walk, a particular policy, etc.

To train the policy, the random walk engine 210 can train a reinforcement learning model over training samples. Training samples can include historical data such as historical user queries and historical output data (e.g., one or more listings of items) responsive to the historical user queries. In some cases, training samples can also include user feedback information. For example, user feedback information can include user interactions with the historical output data responsive to historical user queries. User feedback can include positive feedback or interactions such as clicking, adding to cart, or purchasing a listing of item, and negative feedback or interactions such as indicating a lack of interest in the listing of item.

Rewards (e.g., edge scores or weights) associated with actions (e.g., edges) for nodes are updated by optimizing an objective function, e.g., maxing the rewards along a particular trajectory. In the context of a reinforcement learning model, an objective function can include a total reward (e.g., a value function for a state, also referred to as a state value function) in each episode (e.g., one or more time steps). The random walk engine 210 can store the trained reinforcement learning model in the storage 230 and deploy the trained model to process user queries 105 and graph data 203 for generating an output data 225. For simplicity, the description below refers to the trained reinforcement learning model as a trained policy or policy function, and all random walk samplings are performed according to the trained policy.

The random walk engine 210 further includes a multi-thread engine 215 to perform the above-noted random walks starting at different nodes in parallel. In general, the multi-thread engine 215 is configured to generate parallel instructions to assign different random walks to different threads or cores in one or more processors or computers in the random walk engine 210. The one or more processors or computers can be local or remote to the random walk engine 210.

To ensure each random walk sampling is independent from other random walk samplings, the multi-thread engine 215 can further determine different seeds for initiating each random walk sampling.

Upon receiving instructions to perform assigned random walk operations, each thread or core independently performs a random walk along a particular trajectory determined according to the policy. The policy generally defines a biased transition according to weights of edges connecting a current node to a next node. Depending on the task and the graph's characteristics, the multi-thread engine 215 can define or receive parameters for controlling the parallelization. For instance, the multi-thread engine 215 could have a global termination criterion that stops all threads when a certain condition is met. In addition, the multi-thread engine 215 can be configured to determine load balancing to ensure that each thread or core has a roughly equivalent workload such that the computation resource is optimally utilized.

In some implementations, the multi-thread engine 215 can issue instructions to synchronize random walk sampling performed in parallel. However, since there is little data or result dependencies across different random walk operations, the multi-thread engine 215 can issue instructions for asynchronously performing random walks in parallel.

Figure 3:
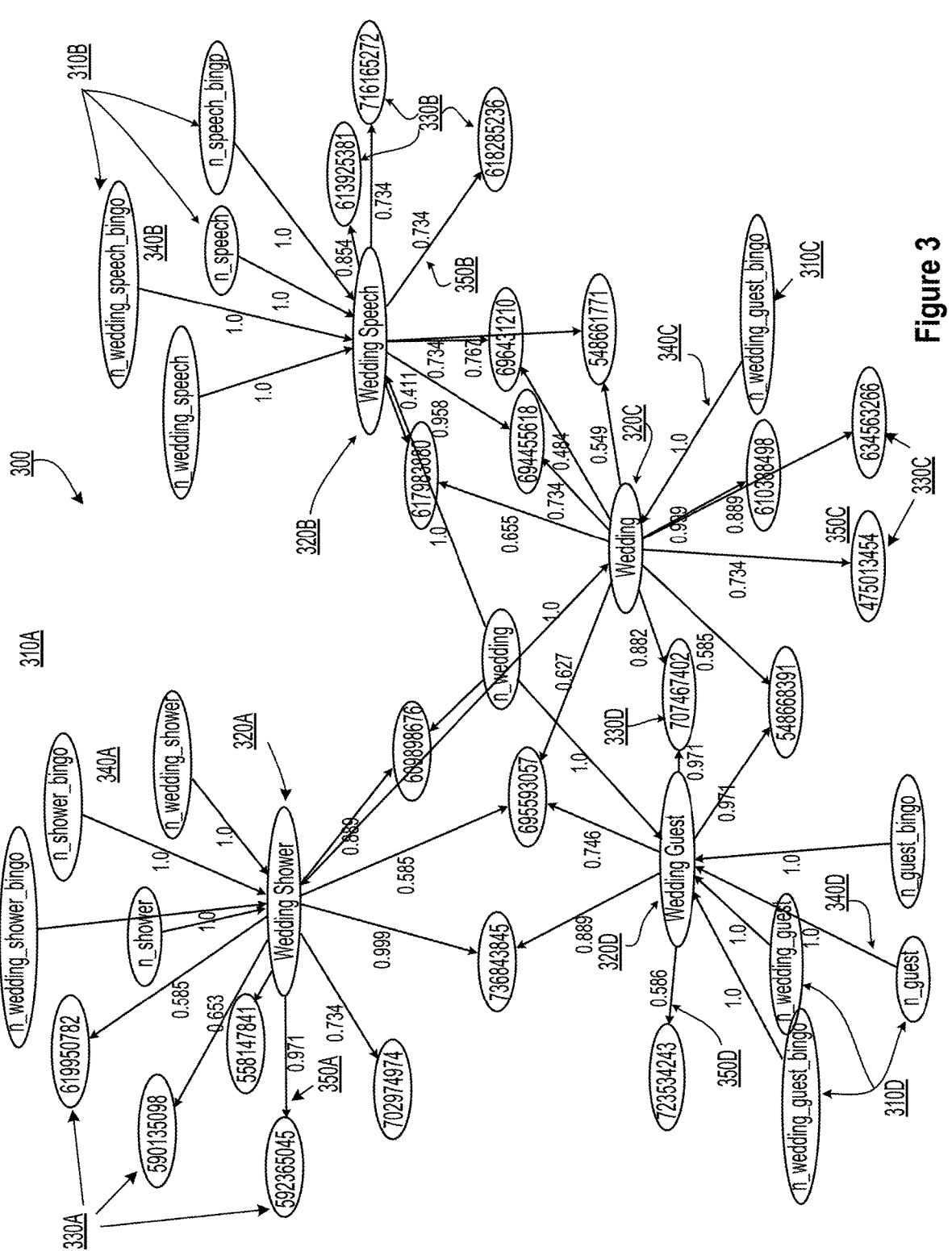
FIG. 3 illustrates a computational graph representing relations between user queries and listings of items responsive to user queries.

FIG. 3 illustrates a computational graph 300 representing relations between user queries and listing of items responsive to user queries.

In general, the exchange platform (e.g., exchange platform 110 of FIG. 1) can include historical data representing relations or interactions between user queries and corresponding output data for user queries. For example, the historical data can include a previous user query related to "wedding," "wedding shower," "wedding speech," or "wedding guest," and corresponding output data responsive to the previous user query. For example, the output data represents a listing of items related to a "wedding," "wedding shower," "wedding speech," or "wedding guest." These listings of items are associated with items offered by providers on the exchange platform. The relations and interactions between user queries and corresponding output data can be used to generate a computational graph (e.g., a computational graph 300 of FIG. 3).

As shown in FIG. 3, the computational graph 300 can include one or more query nodes (Q) representing user queries. The query nodes can include a first user query 320A related to a "wedding shower," a second user query 320B related to a "wedding speech," a third user query 320C related to a "wedding," and a fourth user query 320D related to a "wedding guest."

The computational graph 300 can include one or more listing nodes (L) representing output data (e.g., listing of items) for corresponding user queries. In some cases, for exchange platforms having listing inventory from providers running shops or stores on the exchange platform, listings of items can be further grouped by shops or stores they belong to, and each listing can be further tagged by providers with different tags for better describing the item. Given that, listing nodes (L) can be further grouped by shop nodes(S) and tag nodes (T). A shop node(S) generally represents a unique shop identifier for a corresponding shop, and a tag node (T) generally represents a unique tag for an item or a listing of items. For example and as shown in FIG. 3, the query node 320A is linked to one or more shop nodes 330A, each shop node having a unique identifier, e.g., represented by a sequence of numbers. The query node 320A is also linked to one or more tag nodes 310A each tag node having a unique tag, such as a "n_wedding_shower_bingo," "n_shower_bingo," "n_wedding_shower."

Each node (L), (S), or (T) is connected with a query node (Q) by a respective edge in the computational graph 300, and each respective edge has a weight value associated with it. An edge can have one or two directions, and each direction can have a respective weight value. More specifically, weight values for two opposite directional edges between two neighboring nodes can be different. For example, a directional edge from node A to node B can be determined with a weight value of 0.2, and another direction edge from node B to node A can be determined with a weight value of 1.4. Note these weight values are provided as examples and should not be used to infer a range or a scale for the weight values. In some cases, weight values can be normalized such that the range of a weight value goes from zero to one.

A weight value can represent a likelihood or an instant reward of transitioning between nodes along the direction. The weight value or edge weights can be determined using different techniques, for example, reinforcement learning techniques described above.

As shown in FIG. 3, a first edge 350A from node 320A to one of the shop nodes 330A (e.g., "592365045") can have a weight value of 0.971, and a second edge 340A from node 320A to one of the tag nodes 310A (e.g., "n_shower_bingo") can have a weight value of 1.

Similarly, other user query nodes (e.g., nodes 320B, 320C, and 320D) can be connected with their respective shop nodes (e.g., nodes 330B, 330C, and 330D) and tag nodes (e.g., nodes 310B, 310C, and 310D) using respective edges (340B, 340C, 340D, 350B, 350C, and 350D) with respective weight values.

Figure 4:
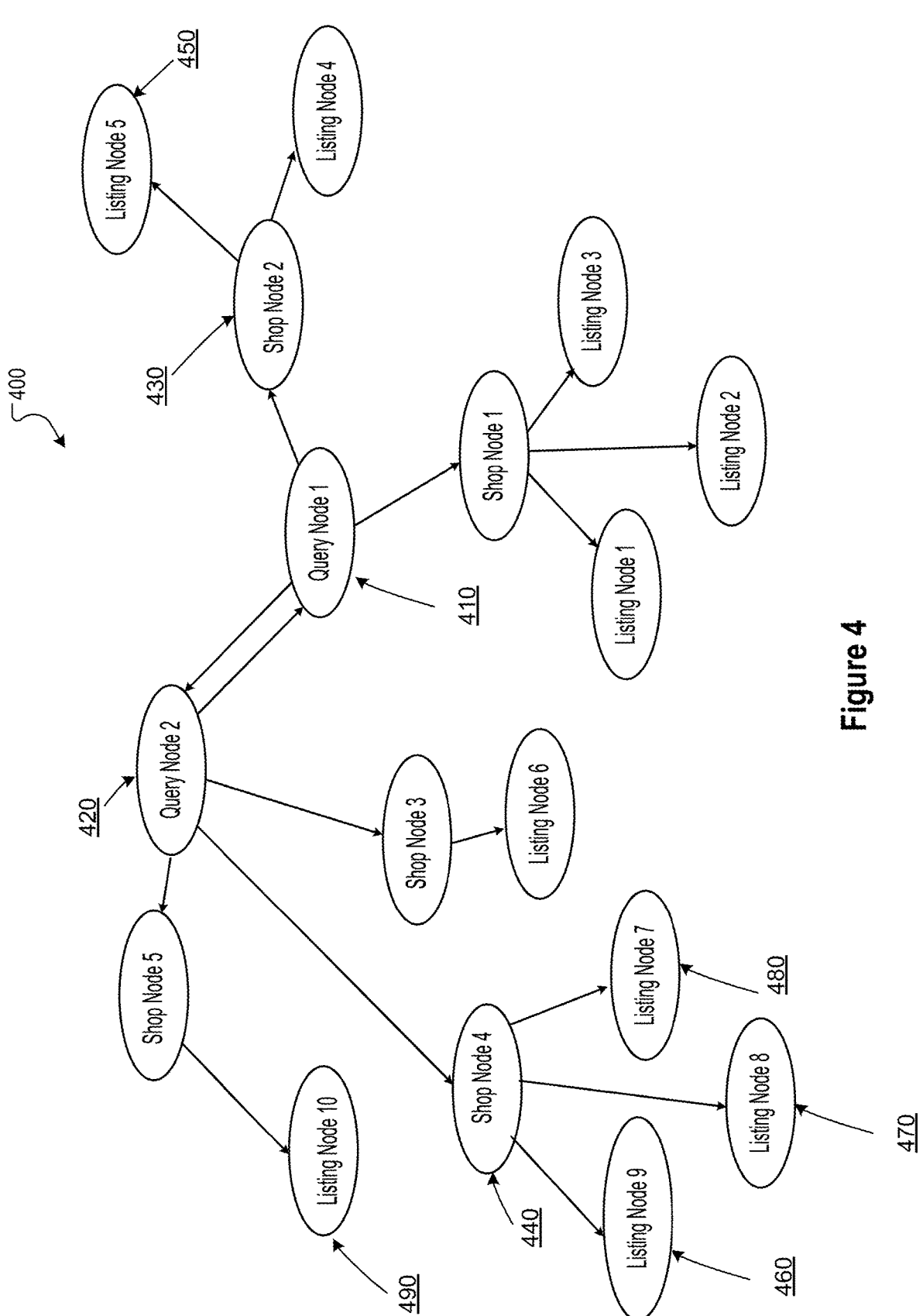
FIG. 4 illustrates random walks starting at different nodes of an example computational graph.

FIG. 4 illustrates random walks starting at different nodes of an example computational graph 400. The computational graph 400 in FIG. 4 is similar to the computational graph 300 of FIG. 3 or a sub-computational graph (e.g., a portion) of a computation graph.

As shown in FIG. 4, the computation graph 400 includes two query nodes 410 and 420, five shop nodes (i.e., shop nodes 1 to 5), and ten listing nodes (listing nodes 1 to 10). The two query nodes 410 are connected by two edges with opposite directions. Each shop node is connected to a respective query node and a respective set of listing nodes.

The system described herein (e.g., random walk engine 210 of FIG. 2) is configured to receive a user query and determine a primary node based on the user query. As described above, a primary node can be a query node determined according to the textual portion of the user query through a lookup table. For example, the system can determine query node 1 (410) or query node 2 (420) as the query node.

After determining the primary node (e.g., the corresponding query node) for the user query, the system can determine a first set of random walks starting at the query node. For example, the system can determine 50,000, 100,000, 500, 000, or more random walks starting from query node 1 (410). The system can further determine the length or steps for each random walk in the first set of random walks. For example, the system can determine that each of the first set of random walks has a length of two, three, five, or more edges.

Each of the first set of random walk samplings is performed according to a pre-trained policy or policy function using reinforcement learning. The policy predicts an edge directing from a current node to the next node based on edge weights or rewards associated with corresponding edges. In some situations, the system can train a policy or a policy function by performing the first set of random walk samplings over training data. Training data generally includes training queries and, optionally, corresponding benchmark output listing nodes. The policy function parameters (or edge weights) are updated by optimizing an objective function (e.g., maximizing the rewards of a random walk).

Each of the first set of random walks reaches a listing node in the computational graph 400. For example, a first random walk starting from the query node 1 (410) reaches listing node 1, a second random walk starting from the query node 1 (410) reaches listing node 7, and a third random walk starting from the query node 1 (410) reaches listing node 5.

The system generates a first set of listing nodes as an output for the first set of random walks. The first set of listing nodes can include a data structure representing all listing nodes reached by the first set of random walks. For example, the first set of listing nodes can include listing node 1, listing node 7, listing node 5, and listing node 10. In addition, the system can generate a mapping between each of the listing nodes to a respective score. The score generally represents the likelihood (or proportional to the likelihood) of a listing node being selected as an output in response to a user query. For example, a listing node mapped with a higher score is more likely to be selected as an output listing node responsive to the user query. In other words, the mapping between the listing nodes and corresponding scores can be used to generate a set of key-value pairs, each key representing a listing node in the first set of listing nodes and each corresponding value representing a score for the key.

The system is configured to boost one or more listing nodes in the first set of listing nodes by performing additional random walks starting at one or more secondary nodes. For example, the system can determine one or more shop nodes as the secondary nodes according to the contextual information associated with the user query. As described above, the contextual information can be related to historical user activities, e.g., the most recent visit or purchasing of an item at a shop. In addition or alternatively, the contextual information can be related to reflect a user's interest, e.g., a most recent like on an item of a shop, a most recent action of liking an item or a shop or adding an item to a shopping cart. As an example in view of FIG. 4, the secondary nodes can include shop node 2 (430), shop node 4 (440), and shop node 10 (490).

In this document, the secondary nodes are described to be determined substantially based on contextual information and are substantially independent of a user query. However, in some cases, the secondary nodes can be determined based on both the user query and contextual information.

Moreover, determining secondary nodes can also depend on a time period since the contextual information was collected and a threshold time period. For example, the system might only consider user activities that happened within a threshold time period since it occurred, and might not consider, e.g., a recent purchase of an item in a shop that is beyond the threshold time period, e.g., 30 days, 60 days, 90 days, or more.

The system can determine a number of additional random walks starting at one or more secondary nodes. In some implementations, the additional random walks can be a fraction of the random walks starting at primary nodes (e.g., query nodes). For example, shop node 2 (430) can be assigned with 10,000 additional random walks, shop node 4 (440) can be assigned with 20,000 additional random walks, and shop node 10 (490) can be assigned with 50,000 random walks.

Similarly, the additional random walks starting at the secondary nodes are performed according to the same trained policy as those random walks starting at the primary node. The system can obtain outputs from the additional random walks, which can be a second set of listing nodes reached by the additional random walks. For example, the second set of listing nodes can include listing node 5 (450), listing node 7 (480), listing node 8 (470), listing node 9 (460), and listing node 10 (490). Each of these listing nodes can be visited or reached a respective number of times by the additional random walks.

In some cases, the system can obtain or determine a set of weights for secondary nodes for adjusting the effect of the additional random walks starting at secondary nodes over the scores for the listing of nodes reached by random walks starting at the primary node. For example, the system can determine a respective node weight for each of the secondary nodes. The weight can range from zero to one. Assuming the policy is trained and edge weights are stable (i.e., fixed or not updating), the node weights are mathematically equivalent to factors multiplied by the total number of additional random walks on each of the secondary nodes. In other words, the system can reduce the total number of additional random walks starting at secondary nodes to reduce the boosting effect over the original scores.

The system determines a final score for each listing node of the first set of listing nodes reached by the first set of random walks starting at the primary node. According to the above-noted example, the first set of listing nodes include listing node 5 (450), listing node 1, and listing 7 (480).

To determine a final score, the system loops over the first set of listing nodes and determines a boost to listing nodes of the first set of listing nodes that are also included in the second set of listing nodes reached by additional random walks starting at secondary nodes. These listing nodes in the first set of listing nodes are also referred to as overlapping nodes in the following description. According to the above-noted example, the overlapping listing nodes are listing node 5 (450) and listing node 7 (480).

The system boosts scores for the above-described overlapping listing nodes. According to the above-noted example, the system boosts scores for listing node 5 (450) and listing node 7 (480) based on the number of reaches (or counts of reaches) at these two nodes by the additional random walks. One example algorithm relates to boosting an original score of an overlapping node based on a value proportional to a total count of reaches at the overlapping node and (ii) a boost value. The boost value ranges from zero to one and can be pre-determined. Another example algorithm relates to boosting a score for an overlapping node using an exponentiation function, where the base is proportional to a total count of reaches at the overlapping node, and the power value ranging from zero to one. The power value can be pre-determined. The exponentiation function can be expressed as follows:

$$\text{Score}(k) + = v^{Boost} \qquad\qquad \text{Equation (1)}$$

The term "score" represents a score for an overlapping node "k" that is in both sets of listing nodes, the term "v" represents an instance of reaching (or ending at) the overlapping node "k" or a value proportional to the total count of reaches at the overlapping node "k," and the term "boost" represents a power value ranging from zero to one, controlling the influence of additional reaches at overlapping nodes. As an example, the term "v" can be expressed as below:

$$v = \frac{1}{D(k)^{\beta}} \qquad\qquad \text{Equation (2)}$$

The term "D(k)" represents a degree of the overlapping node "k," and the term "β" represents a power or a weight of influence of the term "D(k)," which ultimately influences the value proportional to the counts of arrivals at overlapping nodes. The term "β" can have a value greater than or equal to zero. If the value of "β" is set to be zero and the value of "Boost" is set to be one, for each random walk, the term "v" becomes a constant (i.e., one) according to Equation (2), and each arrival or reach at a node k would increase the score in by one according to Equations (1) and (2).

Given equation (1), scores for nodes in the set of listing nodes reached only the random walks starting at the primary node are not updated. Once the final scores are obtained for the set of listing nodes, the system determines one or more listing nodes as an output in response to the user query. For example, the system can choose one or more listing nodes with the top one, three, five, ten, or more scores as output data to be provided to a user device for the user query.

Figure 5:
FIG. 5 is a flow diagram of an example process for processing a user query using random walks.
Figure 5:
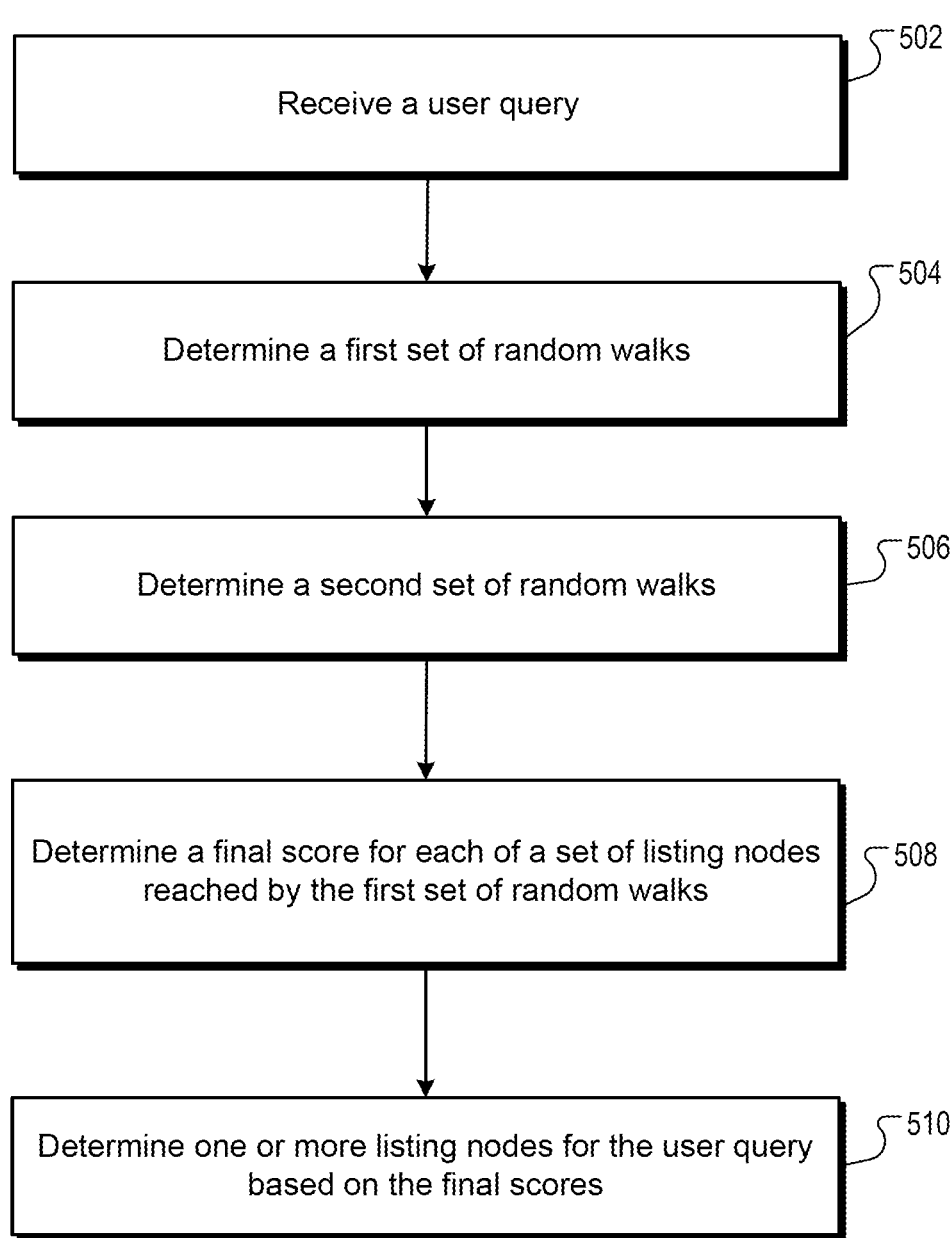

FIG. 5 is a flow diagram of an example process 500 for processing a user query using random walks. For convenience, the process 500 is described as being performed by a system of one or more computers located in one or more locations. For example, a system, e.g., the exchange platform 110 of FIG. 1, the search engine 118 of FIG. 1, or the random walk engine 122 of FIG. 1, when appropriately programmed, can perform the process 500.

To process a user query, the system performs inference operations of the trained reinforcement learning model. For example, the system can fetch data representing the determined value function or policy function from memory and process a user query using the computational graph based on the determined value function or policy function. The training process is described above in connection with FIG. 2.

The system receives a user query (502) from a user device. The user query corresponds to an initial node of multiple initial nodes in the directional graph stored in the exchange platform. A user query can include text information, graphic information, or other suitable information indicating a corresponding user's interest. The system can set the user query as an initial node in the computational graph. In some cases, the system can select an existing user query node as the node for the user query. Alternatively, the system can generate a new user query node for the user query after determining a location for the new query node. To determine the location, the system can use a lookup table with keys that substantially match the textual portion of the user query. In some implementations, the system can generate embeddings of the information included in the user query, and determine the location based on the embeddings. Once the new user query node is added to the computational graph, the system can determine the connectivity of the user query node to other existing nodes using various techniques. For example, the system can connect the new user query node with all possible exiting nodes or nodes in a cluster that encompasses the location of the new user query node. Alternatively, the system can determine a level of similarity between the user query to existing user query nodes, and determine the location based on the level of similarity. And if a new query and an existing user query node share a level of similarity above a threshold level, the system can assign the new query to the existing user query node.

After receiving the user query, the system processes the user query to determine one or more listing nodes in the computational graph in response to the user query. To determine the one or more listing node, the system first determines a first set of random walks starting at the primary node (504). Each of the first set of random walks is performed according to a pre-trained policy or policy function using reinforcement learning. The pre-trained policy represents the likelihood or rewards for each edge from a current node to the next node, and a trajectory obtained by a random walk performed according to the pre-trained policy starts at the primary node and ends at a listing node. The set of listing nodes reached by the random walks starting at the primary node are mapped with scores representing a probability distribution of the set of listing nodes selected as output listing nodes in response to the user query.

The system then determines a second set of random walks starting at one or more secondary nodes (506). The system first determines one or more secondary nodes according to the contextual information associated with the user providing the user request. The one or more secondary nodes can include shop nodes that are generally different from the primary node (e.g., a query node). As described above, the contextual information can represent recent user activities, user interests, etc. The contextual information also provides data representing a recency of user activities (e.g., a period since the most recent action was performed). The system can compare the recency of a user activity with a threshold period and determine whether to select secondary nodes based on that user activity. For example, the system does not select a secondary node representing a shop if such a user activity was performed earlier than a threshold time period, e.g., 30 days, 60 days, 90 days, or other suitable threshold time periods.

The system determines a final score for each of the first set of listing nodes in the computational graph reached by the first set of random walks (506). The final scores are determined based on the outputs of the first set of random walks and the second set of random walks. More specifically, the system determines a first set of listing nodes in the computational graph that are reached by the first set of random walks starting at the primary node according to the pre-trained policy. Each listing node of the first set of listing nodes is mapped with a respective score due to the pre-trained reinforcement learning model. The system further determines a second set of listing nodes in the computational graph reached by the second set of random walks starting at the one or more secondary nodes according to the policy. The system determines overlapping nodes that are in both the first and second sets of listing nodes.

The system determines the final scores by updating scores for the overlapping nodes. (508). More specifically, the system updates scores for overlapping nodes in both the first and second sets of listing nodes by a modification value according to the number or count of reaches by the second set of random walks starting at secondary nodes. As described above, the modification value is computed based on (i) a value proportional to a total count of reaches at the listing node in the second set of random walks and (ii) a boost value. The boost value includes a range from zero to one and can be predetermined. As another example, the modification value can be computed using an exponentiation function with a base proportional to a total count of reaches at the listing node in the second set of random walks and a pre-determined power value. The power value ranges from zero and one.

The system performs the first set of random walks and the second set of random walks in parallel using two or more threads. In particular, the system uses respective random seeds to initiate random walk samplings to avoid obtaining substantially the same sampling results.

The system determines one or more listing nodes from the first set of listing nodes based on the final scores (510). As described above, the system can rank the first set of listing nodes based on the final scores and select the top listing nodes according to the ranking. For example, the system can select the top one, three, five, or more listing nodes as output nodes in response to the user query. The system can provide data associated with one or more listing nodes that correspond to the user query to the user device.

Figure 6:
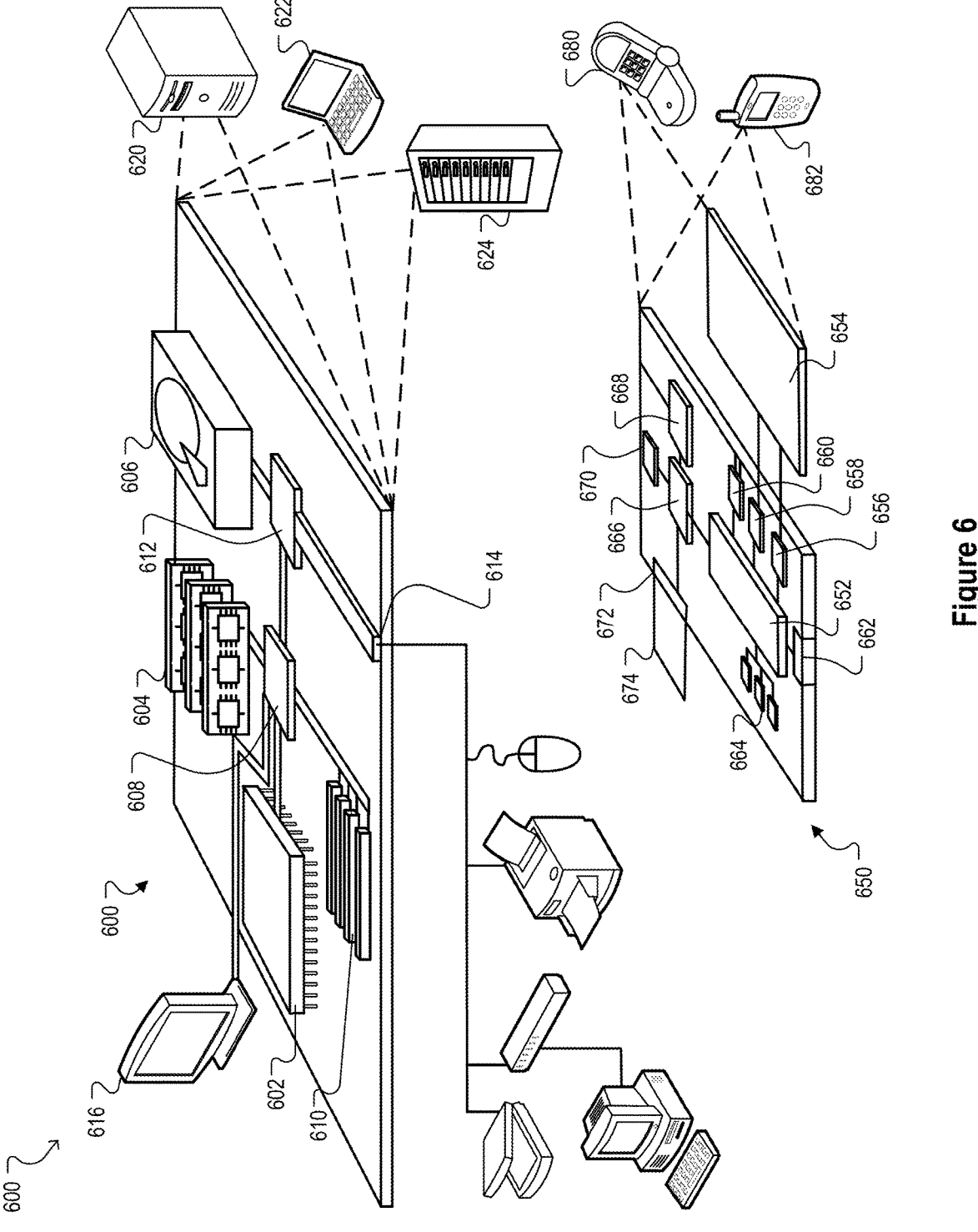
FIG. 6 is a block diagram of computing devices that may be used to implement the systems and methods described in this document.

FIG. 6 is a block diagram of computing devices 600, 650 that may be used to implement the systems and methods described in this document, either as a client or as a server or plurality of servers, or in cloud computing environments. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low-speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a hard disk device, an optical disk device, a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of duties is exemplary only.

In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a Microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using Bluetooth, WiFi, or other such transceivers (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.), and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or another similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications, or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus, and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication, such as, a communication network. Examples of communication networks include a local area network ("LAN"), a wide area network ("WAN"), and the Internet.

The computing system can include clients and servers. A client and server are generally remote from each other and typically interact through a communication network. The relationship between client and server arises by virtue of computer programs running on the respective computers and having a client-server relationship with each other.

As used in this specification, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

In addition to the embodiments described above, the following embodiments are also innovative:

Embodiment 1 is a method for training a reinforcement learning model, comprising receiving, from a user device, a user query corresponding to a primary node in the computational graph; in response to receiving the user query, processing the user query to determine one or more listing nodes in the computational graph for the user query, the processing comprising: determining a first set of random walks starting at the primary node according to a policy trained using reinforcement learning, determining a second set of random walks starting at one or more secondary nodes in the computational graph according to the policy, wherein each of the one or more secondary nodes is determined based on context information and is different from the primary node, determining a final score for each of a first set of listing nodes in the computational graph reached by the first set of random walks based on outputs of the first set of random walks and the second set of random walks, and determining the one or more listing nodes from the first set of listing nodes based on the final scores; and providing, to the user device, data associated with one or more listing nodes that correspond to the user query.

Embodiment 2 is the method of Embodiment 1, wherein determining the final score for each of the first set of listing nodes in the computational graph comprises: determining the first set of listing nodes in the computational graph reached by the first set of random walks from the primary node according to the policy; determining a second set of listing nodes in the computational graph reached by the second set of random walks from the one or more secondary nodes according to the policy; and determining the final score for each of the first set of listing nodes by updating a score for one or more listing nodes in the first set of listing nodes according to the second set of listing nodes.

Embodiment 3 is the method of Embodiment 1 or Embodiment 2, wherein updating the score for one or more listing nodes in the first set of listing nodes comprises: for each listing node in the first set of listing nodes that is also in the second set of listing nodes, updating the score for the listing node in the first set of listing nodes by adding a modification value.

Embodiment 4 is the method of Embodiment 3, wherein the modification value is computed based on (i) a value proportional to a total count of reaches at the listing node in the second set of random walks and (ii) a boost value.

Embodiment 5 is the method of Embodiment 4, wherein the boost value includes a range from zero to one.

Embodiment 6 is the method of any one of Embodiments 3-5, wherein the modification value is computed using an exponentiation function with a base proportional to a total count of reaches at the listing node in the second set of random walks and a pre-determined power value.

Embodiment 7 is the method of any one of Embodiments 1-6, wherein the first set of random walks and the second set of random walks are performed in parallel using two or more threads using respective random seeds.

Embodiment 8 is a system, comprising: one or more memory devices storing instructions; and one or more data processing apparatus that are configured to interact with the one or more memory devices, and upon execution of the instructions, perform operations of any one of Embodiments 1-7.

Embodiment 9 is one or more non-transitory computer-readable media storing instructions that, when executed by one or more data processing apparatus, cause the one or more data processing apparatus to perform operations of any one of Embodiments 1-7.

Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

The invention claimed is:

1. A method, comprising:
receiving, from a user device, a user query corresponding to a primary node in a computational graph;
processing the received user query to determine one or more listing nodes in the computational graph for the user query, the processing comprising:
determining a first set of random walks starting at the primary node according to a policy trained using reinforcement learning, wherein the primary node is determined based on text of the user query,
determining a second set of random walks starting at one or more secondary nodes in the computational graph according to the policy, wherein each of the one or more secondary nodes is determined based on context information associated with one or more user activities and is different from the primary node,
generating a final score for each of a first set of listing nodes in the computational graph reached by the first set of random walks based on outputs of the first set of random walks and the second set of random walks, and
identifying the one or more listing nodes from the first set of listing nodes based on the final scores; and
providing, to the user device, data associated with one or more listing nodes that correspond to the user query.

2. The method of claim 1, wherein generating the final score for each of the first set of listing nodes in the computational graph comprises:
determining the first set of listing nodes in the computational graph reached by the first set of random walks from the primary node according to the policy;
determining a second set of listing nodes in the computational graph reached by the second set of random walks from the one or more secondary nodes according to the policy; and generating the final score for each of the first set of listing nodes by updating a score for one or more listing nodes in the first set of listing nodes according to the second set of listing nodes.

3. The method of claim 1, wherein updating the score for the one or more listing nodes in the first set of listing nodes comprises:

for each listing node in the first set of listing nodes that is also in the second set of listing nodes, updating the score for the listing node in the first set of listing nodes by adding a modification value.

4. The method of claim 3, wherein the modification value is computed based on (i) a value proportional to a total count of reaches at the listing node in the second set of random walks and (ii) a boost value.

5. The method of claim 4, wherein the boost value includes a range from zero to one.

6. The method of claim 3, wherein the modification value is computed using an exponentiation function with a base proportional to a total count of reaches at the listing node in the second set of random walks and a pre-determined power value.

7. The method of claim 1, wherein the first set of random walks and the second set of random walks are performed in parallel using two or more threads using respective random seeds.

8. A system, comprising:

one or more memory devices storing instructions; and one or more data processing apparatus that are configured to interact with the one or more memory devices, and upon execution of the instructions, perform operations including:

receiving, from a user device, a user query corresponding to a primary node in a computational graph;

processing the received user query to determine one or more listing nodes in the computational graph for the user query, the processing comprising:

determining a first set of random walks starting at the primary node according to a policy trained using reinforcement learning, wherein the primary node is determined based on text of the user query, determining a second set of random walks starting at one or more secondary nodes in the computational graph according to the policy, wherein each of the one or more secondary nodes is determined based on context information associated with one or more user activities and is different from the primary node, generating a final score for each of a first set of listing nodes in the computational graph reached by the first set of random walks based on outputs of the first set of random walks and the second set of random walks, and identifying the one or more listing nodes from the first set of listing nodes based on the final scores; and providing, to the user device, data associated with one or more listing nodes that correspond to the user query.

9. The system of claim 8, wherein generating the final score for each of the first set of listing nodes in the computational graph comprises:

determining the first set of listing nodes in the computational graph reached by the first set of random walks from the primary node according to the policy;

determining a second set of listing nodes in the computational graph reached by the second set of random walks from the one or more secondary nodes according to the policy; and generating the final score for each of the first set of listing nodes by updating a score for one or more listing nodes in the first set of listing nodes according to the second set of listing nodes.

10. The system of claim 8, wherein updating the score for the one or more listing nodes in the first set of listing nodes comprises:

for each listing node in the first set of listing nodes that is also in the second set of listing nodes, updating the score for the listing node in the first set of listing nodes by adding a modification value.

11. The system of claim 10, wherein the modification value is computed based on (i) a value proportional to a total count of reaches at the listing node in the second set of random walks and (ii) a boost value.

12. The system of claim 11, wherein the boost value includes a range from zero to one.

13. The system of claim 10, wherein the modification value is computed using an exponentiation function with a base proportional to a total count of reaches at the listing node in the second set of random walks and a pre-determined power value.

14. The system of claim 8, wherein the first set of random walks and the second set of random walks are performed in parallel using two or more threads using respective random seeds.

15. One or more non-transitory computer-readable media storing instructions that, when executed by one or more data processing apparatus, cause the one or more data processing apparatus to perform operations comprising:

receiving, from a user device, a user query corresponding to a primary node in a computational graph;

processing the received user query to determine one or more listing nodes in the computational graph for the user query, the processing comprising:

determining a first set of random walks starting at the primary node according to a policy trained using reinforcement learning, wherein the primary node is determined based on text of the user query, determining a second set of random walks starting at one or more secondary nodes in the computational graph according to the policy, wherein each of the one or more secondary nodes is determined based on context information associated with one or more user activities and is different from the primary node, generating a final score for each of a first set of listing nodes in the computational graph reached by the first set of random walks based on outputs of the first set of random walks and the second set of random walks, and identifying the one or more listing nodes from the first set of listing nodes based on the final scores; and providing, to the user device, data associated with one or more listing nodes that correspond to the user query.

16. The one or more non-transitory computer-readable media of claim 15, wherein generating the final score for each of the first set of listing nodes in the computational graph comprises:

determining the first set of listing nodes in the computational graph reached by the first set of random walks from the primary node according to the policy;

determining a second set of listing nodes in the computational graph reached by the second set of random walks from the one or more secondary nodes according to the policy; and generating the final score for each of the first set of listing nodes by updating a score for one or more listing nodes in the first set of listing nodes according to the second set of listing nodes.

17. The one or more non-transitory computer-readable media of claim 15, wherein updating the score for the one or more listing nodes in the first set of listing nodes comprises:

for each listing node in the first set of listing nodes that is also in the second set of listing nodes, updating the score for the listing node in the first set of listing nodes by adding a modification value.

18. The one or more non-transitory computer-readable media of claim 17, wherein the modification value is computed based on (i) a value proportional to a total count of reaches at the listing node in the second set of random walks and (ii) a boost value.

19. The one or more non-transitory computer-readable media of claim 18, wherein the boost value includes a range from zero to one.

20. The one or more non-transitory computer-readable media of claim 17, wherein the modification value is computed using an exponentiation function with a base proportional to a total count of reaches at the listing node in the second set of random walks and a pre-determined power value.

21. The one or more non-transitory computer-readable media of claim 15, wherein the first set of random walks and the second set of random walks are performed in parallel using two or more threads using respective random seeds.

* * * * *